United States Patent
Namboodiri et al.

(10) Patent No.: US 8,311,116 B2
(45) Date of Patent: Nov. 13, 2012

(54) METHOD AND APPARATUS FOR PERIODIC STRUCTURE HANDLING FOR MOTION COMPENSATION

(75) Inventors: Vipin Namboodiri, Bangalore (IN); Mainak Biswas, Santa Cruz, CA (US); Keepudi Muni Babu, Bangalore (IN)

(73) Assignee: Marvell World Trade Ltd., St. Michael (BB)

(*) Notice: Subject to any disclaimer, the term of this patent is extended or adjusted under 35 U.S.C. 154(b) by 697 days.

(21) Appl. No.: 12/497,841

(22) Filed: Jul. 6, 2009

(65) Prior Publication Data

US 2010/0008423 A1 Jan. 14, 2010

Related U.S. Application Data

(60) Provisional application No. 61/079,269, filed on Jul. 9, 2008.

(51) Int. Cl.
*H04B 1/66* (2006.01)
(52) U.S. Cl. .................................. 375/240.16
(58) Field of Classification Search ........... 375/240.16–240.26; *H04B 1/66*
See application file for complete search history.

(56) References Cited

U.S. PATENT DOCUMENTS

| | | | | |
|---|---|---|---|---|
| 5,502,510 A * | 3/1996 | Kim et al. | .................. | 348/701 |
| 5,659,363 A * | 8/1997 | Wilkinson | .................. | 375/240.11 |
| 7,596,279 B2 * | 9/2009 | Sugimoto et al. | .................. | 382/238 |
| 7,623,719 B2 * | 11/2009 | Molino et al. | .................. | 382/239 |
| 7,903,891 B2 * | 3/2011 | Sugimoto et al. | .................. | 382/238 |
| 7,970,223 B2 * | 6/2011 | Sugimoto et al. | .................. | 382/238 |

* cited by examiner

*Primary Examiner* — Tung Vo

(57) ABSTRACT

A motion compensated picture rate converter for determining a dominant motion vector for a block appearing in two images includes a high-pass filter and a low-pass filter, transform calculators responsive to the filters for performing transforms on at least two images to produce a frequency-domain representation of the images, estimating calculators for estimating a plurality of motion vectors based on the frequency-domain representations, and a periodic structure detection and elimination module responsive to the transform calculators and the estimating calculators for identifying a period based on the frequency-domain representation of the images and for selecting a dominant motion vector based on the estimated motion vectors and the identified period. A method of operation is also disclosed.

16 Claims, 5 Drawing Sheets

METHOD AND APPARATUS FOR PERIODIC STRUCTURE HANDLING FOR MOTION COMPENSATION

This application claims the benefit of U.S. Provisional Patent Application No. 61/079,269, filed 9 Jul. 2008 and entitled Periodic Structure Handling for Motion Compensated Frame Converter, which is hereby incorporated by reference in its entirety for all purposes. This application is related to U.S. Non-Provisional patent application Ser. No. 12/400,207, filed 9 Apr. 2009 and entitled Filter Bank Based Phase Correlation Architecture for Motion Estimation, which is hereby incorporated by reference in its entirety for all purposes.

FIELD

The technology described in this document relates generally to the field of image generation and, more particularly, to the use of motion information in the generation of images.

BACKGROUND

Motion information is a very important aspect of image generation. For example, in many frame sequences, the only difference between one frame and the next is the relative motion of objects within the frames. Video compression takes advantage of that fact by encoding image data, for example, every fourth frame. For the frames in between, only the information needed to generate the missing frames is stored. Part of the information needed to generate the missing frames is information about the motion of the objects within the frames.

Another example of where motion information is important occurs when a frame rate of an input signal is inconsistent with the frame rate needed for an output device. Typical movie films are recorded at 24 Hz, 25 Hz, or 30 Hz. Picture rates of common video cameras are 50 Hz and 60 Hz. Commercially available television displays, on the other hand, have picture rates up to and beyond 120 Hz. To interface broadcast video with a high-end TV display, the original sequence from the broadcast video needs to be up-converted using, for example, a picture rate converter. A picture rate converter typically operates by interpolating image frames at time instances where the frame sequence from a lower-frequency source device has not yet been converted for a higher-frequency destination display.

In simple picture rate converters, a picture is often repeated in the destination display until the next picture arrives from the source device, which oftentimes results in blur and judder when motion occurs. Motion estimation and compensation circuits may be used in a picture rate converter to reduce these unwanted effects and achieve a high performance conversion for moving sequences. Motion compensation operates by estimating where objects of an interpolated picture would be, based on the direction and speed of the movement of those objects. The direction and speed values may then be expressed as motion vectors and are used to "move" the objects to the correct position in a newly generated frame. If this technique is applied correctly, its impact may be immediately visible on any picture sequence involving motion, where the resulting pictures can hardly be distinguished from the original sequences before the up-conversion.

FIGS. 1A and 1B illustrate two frames (frames A and B, respectively) that show a typical scene with periodic structure and the artifact (seen in FIG. 1A) caused due to the periodic structure. There is a direct correlation between the motion between the frames and the pitch (period) of the periodic structure. Let us assume that the motion of the pixels including the periodic structures between frame A and frame B is 10 pixels and the pitch (period) of the periodic structure is 12 pixels. Thus, when we find the correlation between frame A and B, there is a dual relation between the motion and the pitch. The correlation surface resulting from application of either transform domain techniques or spatial domain techniques will show a match at the pixel located 10 pixels from the origin as well as at the pixel located −2 pixels from the origin. If we generalize the case, then we will see that if the pitch is (M, N) and the motion is (X, Y) in the vertical and horizontal directions, respectively, then due to the duality, we will have correct motion information of X and Y as well as incorrect motion information of (X-M) and (Y-N). When the motion is assigned to the dense pixel field, the incorrect motion information of (X-M) and (Y-N) will cause objectionable artifacts. Thus, one of the major artifacts present in motion compensated images is motion vector errors due to the presence of periodic structures. Most of the motion compensated algorithms show this artifact as it is a difficult problem to solve without relevant image specific information.

SUMMARY OF THE INVENTION

This document discloses a method and apparatus for identifying the presence of a periodic structure in an image and for removing the outlier motion vector associated with it. In one embodiment, the method is comprised of performing a transform on at least one image to produce a frequency-domain representation of the image, estimating a plurality of motion vectors and a period based on the frequency-domain representation, and selecting a dominant vector based on the estimated motion vectors and the period. The selection of a dominant motion vector may comprise determining a candidate dominant motion vector and calculating an absolute value of a difference between the candidate dominant motion vector and each of the estimated motion vectors. Each of the absolute values is compared with a range for the dominant motion vector and estimated motion vectors are eliminated based on the comparing. The elimination may occur when an absolute value falls within a range for the dominant vector. The range for the dominant vector may come from a look up table and be based on the period.

Candidates for the dominant motion vector may be selected based on an average of dominant motion vectors for blocks neighboring the block for which a dominant motion vector is to be determined. Alternatively, in embodiments where the image is filtered with a high-pass filter and a low-pass filter, a candidate for the dominant motion vector may be selected from a motion vector estimated from the frequency response of the low-pass filter.

Also disclosed is a system comprising a transform calculator for performing a transform on at least one image to produce a frequency-domain representation of the image. An estimating calculator estimates a plurality of motion vectors based on the frequency-domain representation. A periodic structure detection and elimination module is responsive to the transform calculator and the estimating calculator for identifying a period based on the frequency-domain representation of the image and for selecting a dominant motion vector based on the estimated motion vectors and the identified period. An alterative embodiment includes a high pass-filter and a low-pass filter, with the transform calculator being responsive to the filters.

In one embodiment, the periodic structure detection and elimination module may be configured to:

identify a range for a dominant motion vector in response to the transform calculator;

determine a candidate dominant motion vector;

calculate an absolute value of a difference between the candidate dominant motion vector and each of the estimated motion vectors;

compare each of the absolute values with the range; and eliminate estimated motion vectors based on the comparing.

Candidates for the dominant motion vector may be selected based on an average of dominant motion vectors for blocks neighboring the block for which a dominant motion vector is to be determined or, where the image is filtered with a high-pass filter and a low-pass filter, a candidate for the dominant motion vector may be selected from a motion vector estimated from the frequency response of the low-pass filter.

One specific implementation of the hardware is a motion compensated picture rate converter which may carry out an embodiment of the disclosed method for determining a dominant motion vector for a block appearing in an image. The hardware has been implemented and has shown exemplary resilience to the presence of the periodic structures in the image sequences. Those advantages and benefits, and others, will be apparent from the following description.

BRIEF DESCRIPTION OF THE DRAWINGS

For the present disclosure to be easily understood and readily practiced, the present disclosure will be discussed, for purposes of illustration and not limitation, in conjunction with the following figures.

DETAILED DESCRIPTION

Figure 1A:
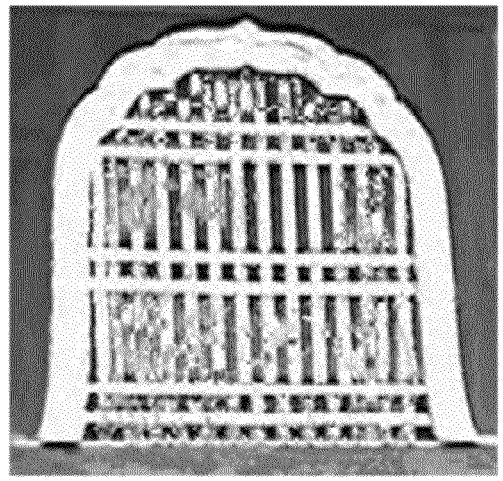
FIGS. 1A and 1B illustrate two frames in which an object moves from frame A to frame B.
Figure 1B:
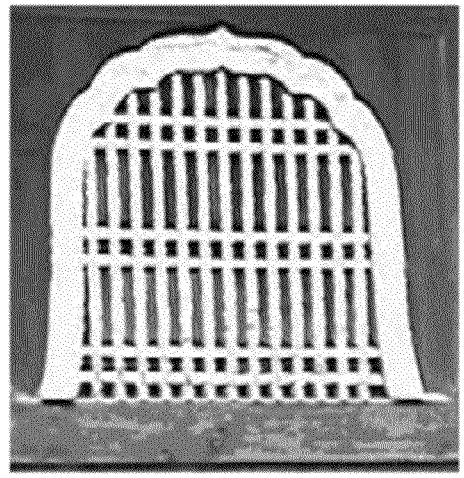
Figure 2:
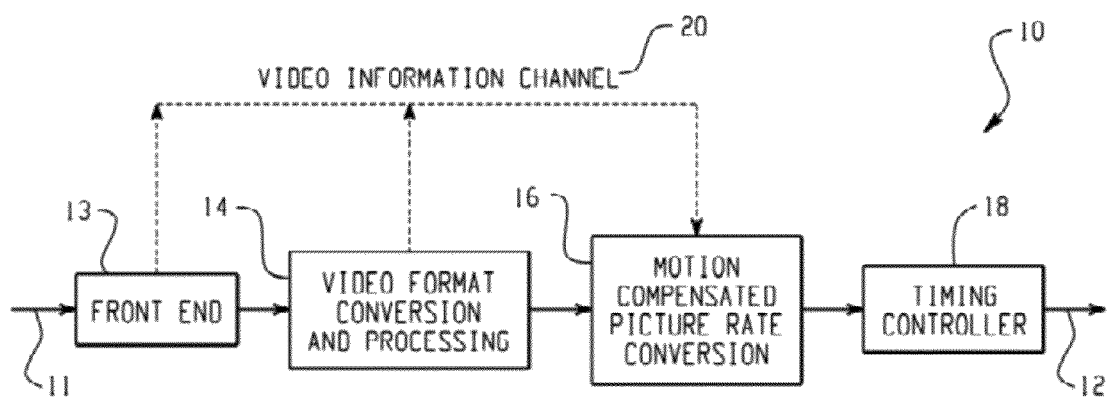
FIG. 2 is a block diagram illustrating a motion compensated picture rate converter (MCPRC) system.

FIG. 2 is a block diagram illustrating a motion compensated picture rate converter (MCPRC) system 10. Although the present invention is discussed in the context of the MCPRC system 10 of FIG. 1, those of ordinary skill in the art will recognize that the present invention may be used in other applications. An input signal 11, having a discrete sequence of video frames, is input to the MCPRC system 10, which produces an up-converted, motion compensated output signal 12 via modules 13, 14, 16, and 18. Each of the modules of MCPRC system 10 is described herein. The output signal 12 from the MCPRC system 10 has a frame rate that is typically higher than the frame rate of the input signal 11. For example, the input signal 11 may be produced from a video camera that has a picture rate of 60 Hz. This video signal may need to be up-converted using the MCPRC system 10 to be suitable for output on an LCD panel display having, for example, a refresh rate of 120 Hz. In general, frame rate up-conversion is achieved by generating and inserting a pre-determined number of frames between every pair of temporally adjacent input frames. These intermediate frames may be generated in a manner so as to approximately capture motion trajectories of objects between frames, thereby enhancing the overall smoothness of a video image sequence as it is displayed after up-conversion.

With reference to FIG. 2, the input signal 11 is first processed by a front-end module 13. The front-end module 13 may contain components such as tuners, demodulators, converters, codecs, analog video decoders, etc. An output from the front-end module 13 is then passed downstream to a video format conversion and processing module 14 which may apply additional video enhancements such as reducing analog noise and compression artifacts, scaling, OSD blending, color management, etc. The resulting output is fed to a motion compensated picture rate conversion (MCPRC) module 16 producing an output that is processed by a timing controller 18 before being propagated as the output signal 12.

The entire MCPRC system 10 illustrated in FIG. 2 may be implemented on a single chip in hardware or software. In one example, an MCPRC chip may be incorporated into television circuitry where an up-converted, post-processed output of the MCPRC chip is transmitted to an external display panel for video. However, the MCPRC system 10 of FIG. 2 may also be implemented on a plurality of chips wherein the front-end 13 and video format conversion and processing module 14 are fabricated on one chip and the motion compensated picture rate converter 16 and timing controller 18 are fabricated on a second chip. Additional chip combinations of the elements of FIG. 2 may also be implemented.

As illustrated in FIG. 2, a video information signal path 20 is provided to facilitate the transfer of information between the elements in the MCPRC system 10. In particular, information that may be conveyed to the MCPRC module 16 includes, for example, the position of a closed-captioned display, the presence of an on-screen display, the native frame rate of the input signals, and the origin and active video boundaries of the input signals.

Figure 3:
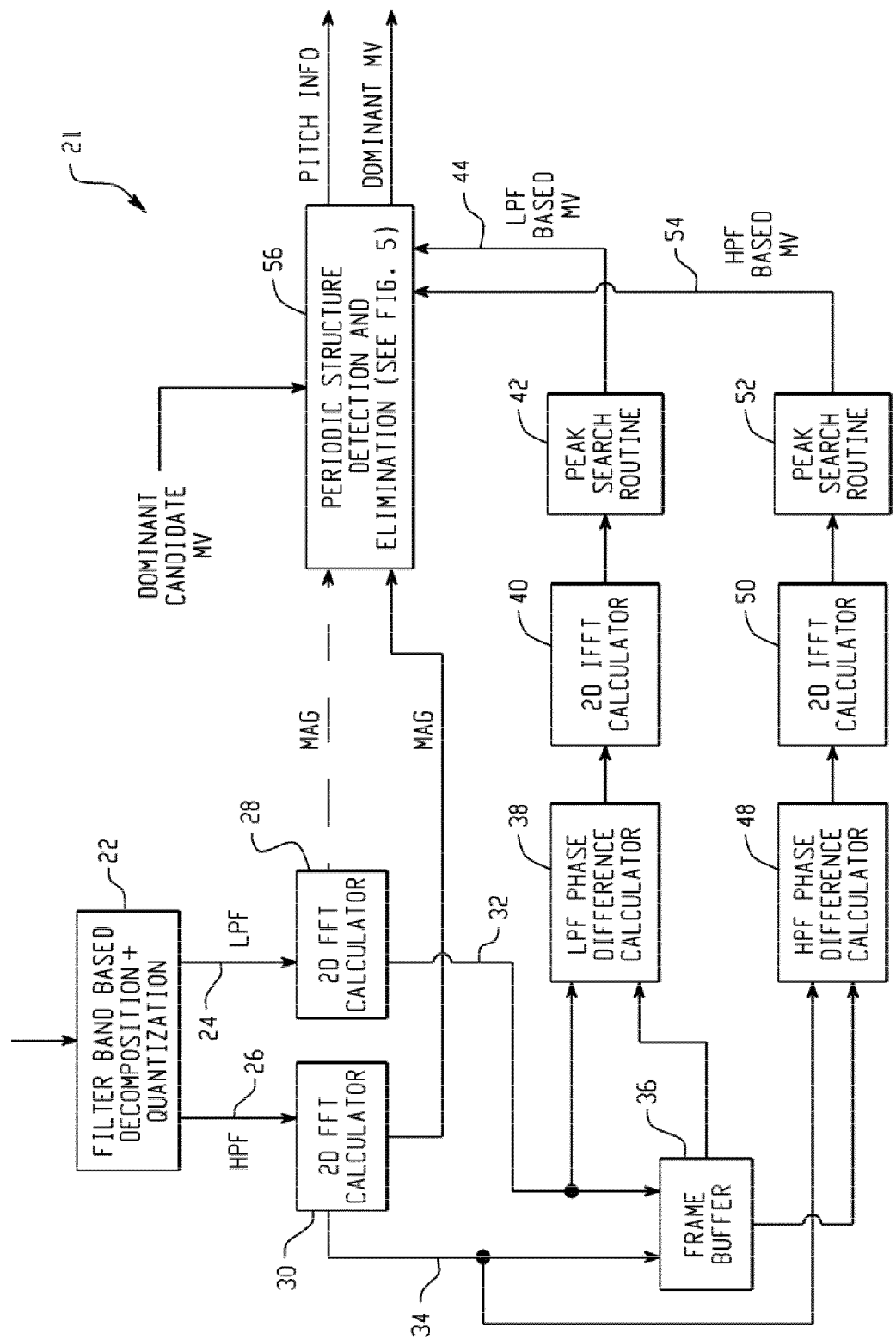
FIG. 3 is a flow diagram illustrating a system for generating motion vectors according to the present disclosure.

FIG. 3 is a flow diagram illustrating a system 21 construction according to the teachings of the present disclosure and used for generating motion vectors. The system 21 calculates the motion between two frames using the Fourier shift theorem. The Fourier shift theorem states that two signals shifted by a uniform translation are phase shifted when represented in the frequency-domain. Thus, by taking the Fourier transform of two images that are shifted by a given translation, the Fourier representation of the signal is shifted by a phase shift that is proportional to the translation. The inverse Fourier transform of the phase shift generates a phase correlation surface where the position of the peaks in the surface represents the magnitude of the shift, and the height of the peaks represents the reliability of the estimated motion vectors. The maximum translation that system 21 is capable of detecting is based on the size of the Fourier transform. An N point horizontal by M point vertical Fourier transform can measure a maximum shift of +/−N/2 horizontal and +/−M/2 vertical. The typical motion range for a 1080p resolution signal may require a Fourier transform of 64×32 pixels or more.

Blocks, as used herein, refers to groups of pixels, including a single pixel. When block sizes become large, the reliability of the estimated motion vectors may decrease. Thus, it is often possible to miss small object motion because small objects do not make large contributions to the correlation surface and are masked by noise in the image. To circumvent this problem, a filter bank based design may be utilized. Filtering the input signal into low-pass representations and high-pass representations aides in identifying both large and small object motion within a video frame. By decomposing input signals into both low-pass and high-pass representations, both small and large object motion may be better accounted for and more optimal motion compensation may be accomplished. The low-pass filtered image captures the global motion or large object motion in the block, and the high-pass filtered image captures the small object motion. Two paths may be provided, one for processing the low-pass filtered image and one for processing the high-pass filtered image.

The process by which the apparatus of FIG. 3 generates motion vectors begins with the receipt of previous frame data and current frame data for a block at a filter band based decomposition and quantization unit 22. In the filter band based decomposition and quantization unit 22, the effect of noise is minimized by quantization of the signal, and the previous frame data and current frame data are decomposed into low-pass 24 and high-pass 26 representations via a low-pass filter and a high-pass filter resulting in a low-pass previous frame representation ($F_1(x_1,y_1)$), a low-pass current frame representation ($F_2(x_2,y_2)$), a high-pass previous frame representation ($F_3(x_3,y_3)$), and a high-pass current frame representation ($F_4(x_4,y_4)$), respectively.

Following decomposition, each of the representations is processed by one or more two-dimensional fast Fourier transform calculators (FFTs) 28, 30. The two-dimensional FFT calculators 28, 30 take the time-domain representations output by the filter band based decomposition and quantization block 122 and convert the representations into frequency-domain representations: $F_1(\omega_x, \omega_y)$, $F_2(\omega_x, \omega_y)$, $F_3(\omega_x, \omega_y)$, $F_4(\omega_x, \omega_y)$. Some or all of the frequency-domain representations may be temporarily stored in a frame buffer 36 via lines 32, 34.

Following calculation of the frequency-domain representations, a low-pass filter (LPF) phase difference calculator 38 calculates a phase difference between the low-pass, frequency-domain representations of the previous frame data and the current frame data. For example, the phase difference may be calculated by solving for the "A" and "B" parameters of the following formula:

$$F_2(\omega_x,\omega_y)=e^{-j(A\omega_x+B\omega_y)}F_1(\omega_x,\omega_y).$$

Figure 4:
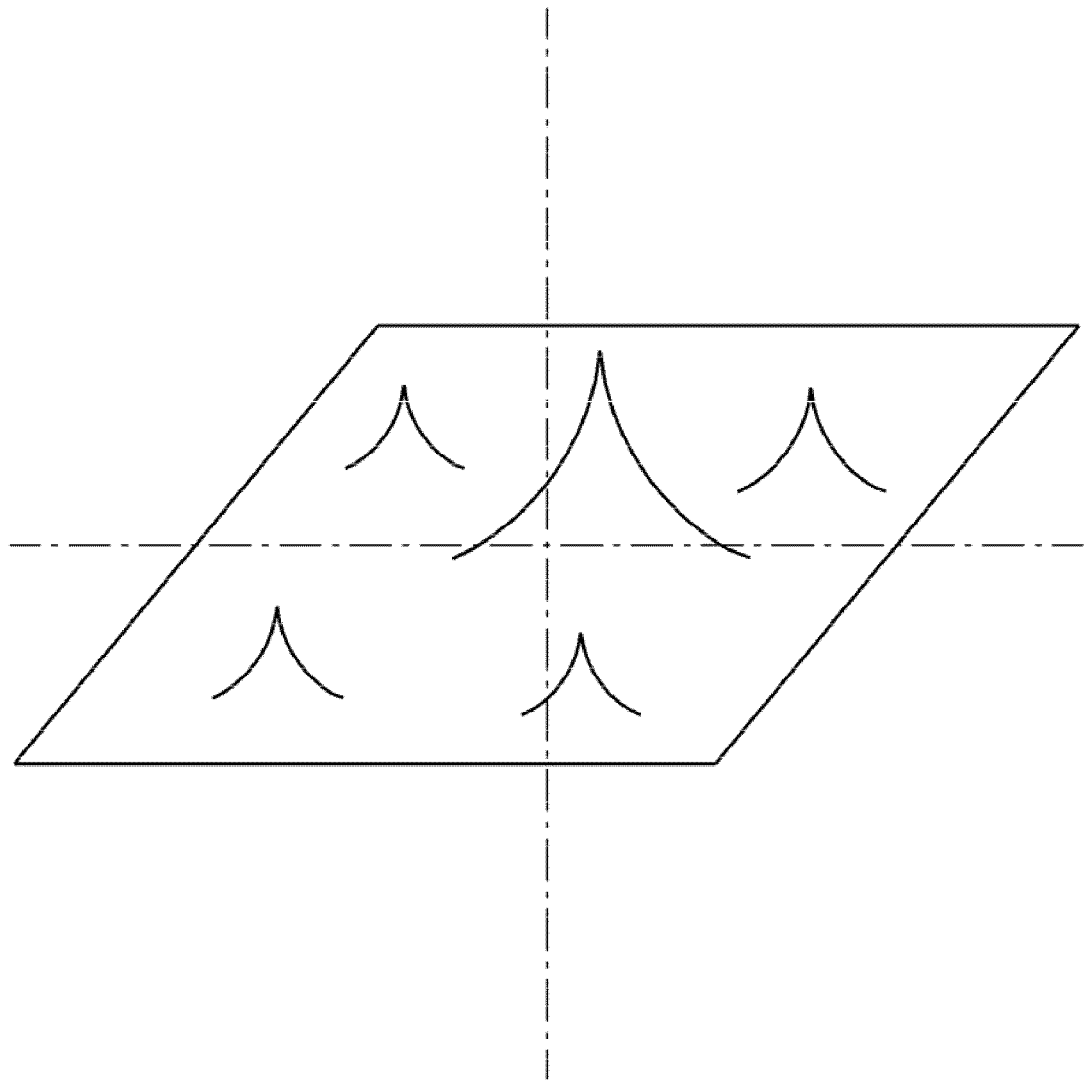
FIG. 4 is an example of a contour map identifying motion between a previous frame and a current frame.

After calculating the phase difference between the previous frame data and the current frame data, a two-dimensional inverse fast Fourier transform (IFFT) calculator 40 operates on the calculated phase difference. The result of the IFFT calculator 40 is a two-dimensional phase plane correlation surface. An example of such a surface is shown in FIG. 4. The phase plane correlation surface may be viewed as a contour map identifying motion between the previous frame and the current frame of the source video. The locations of peaks on the phase plane correlation surface ($a_1$, $b_1$) correspond to motion within the frame block such that:

$$F_2(x_2,y_2)=F_1(x_2+n\cdot a_1,y_2+m\cdot b_1).$$

The height of a peak on the phase correlation surface corresponds to the size of an object that is moving within a block. To estimate peaks within the phase correlation surface, a peak search routine 42 is performed, and based on the identified peaks, a low-pass filter based motion vector 44 is determined. The low-pass filter based motion vector 44 corresponds to large object motion within a frame block.

A similar process is performed utilizing the high-pass frequency-domain representations ($F_3(\omega_x, \omega_y)$, $F_4(\omega_x, \omega_y)$) calculated by the two-dimensional FFT calculator 30. Following calculation of the high-pass frequency-domain representations, a high-pass filter (HPF) phase difference calculator 48 calculates a phase difference between the high-pass, frequency-domain representations of the previous frame data and the current frame data. For example, the phase difference may be calculated by solving for the "C" and "D" parameters of the following formula:

$$F_4(\omega_x,\omega_y)=e^{-j(A\omega_x+B\omega_y)}F_3(\omega_x,\omega_y).$$

After calculating the phase difference between the previous frame data and the current frame data, a two-dimensional IFFT calculator 50 operates on the calculated phase difference. The result of the IFFT calculator may be viewed as a second two-dimensional phase plane correlation surface. The locations of peaks on the second phase plane correlation surface ($c_1$, $d_1$) correspond to motion within the frame block such that:

$$F_4(x_4,y_4)=F_3(x_4+n\cdot c_1,y_4+m\cdot d_1).$$

To estimate peaks within the second phase correlation surface, a peak search routine 52 is performed, and based on the identified peaks, a high-pass filter based motion vector 54 is determined. The high-pass filter based motion vector 54 corresponds to small object motion within a frame block.

Following the operation of the IFFT calculator, the resulting phase correlation surface (see FIG. 4) may have multiple peaks, some corresponding to motion within the block and some resulting from the relationship between the motion and the pitch. The search routines 42, 52 may estimate the top four values of peaks in the correlation surface. Due to the presence of sub-pixel motion it is possible to have peaks whose values are shared between two adjacent locations. Thus, the search routines 42, 52 may estimate a unique peak value in a neighborhood of eight positions. In other words, if a peak is found in position (x, y), then nearby peaks in positions (x+/−1,y+/−1) may not be considered. The location and magnitude of the estimated peaks are then utilized to calculate the low-pass and high-pass based motion vectors 44, 54, respectively. The low-pass and high-pass based motion vectors 44, 54, respectively, are input to a periodic structure detection and elimination apparatus 56, the operation of which is described in detail in conjunction with FIG. 5.

Based on the generalization introduced above, we have correct motion vectors of X and Y as well as a pair of incorrect motion vectors of (X-M) and (Y-N). At this point, we know how the correct and incorrect motion vectors are related, but the problem associated with motion compensated methods is that often the frequency information of the anchor frame is not available. In the current design, because of the use of phase correlation based motion estimation, after the Fourier transform, we have the spectral information of each frame available for input to the periodic structure detection and elimination apparatus 56. Thus, the magnitude of the response at each coefficient used by the 2D FFT calculators 28 and 30 is input to the apparatus 56. We explain below how that spectral information is used to identify the correct pitch and then how the pitch information is used to eliminate the outlier motion vectors.

Completing the description of the system 21 shown in FIG. 3, apparatus 56 also receives one or more candidate dominant motion vectors as described below.

Using basic Fourier series fundamentals we know the Fourier series is used to represent periodic functions as a linear combination of sine and cosine functions. If f(t) is a periodic function of period T, then under certain conditions, its Fourier series is given by:

$$f(t) = \frac{a_0}{2} + \sum_{n=1}^{N} a_n \cos\left(\frac{2\pi nt}{T}\right) + b_n \sin\left(\frac{2\pi nt}{T}\right)$$

where n=1,2,3 ... and T is period of the function f(t), $a_n$ and $b_n$ are the Fourier coefficients.

For our case we have the inverse problem, we know the Fourier coefficients and we have to estimate the periodicity of the function from the coefficients. It is possible to estimate any arbitrary period T from the known coefficients by solving transcendental equations and storing the trigonometric series information. That is a difficult problem to solve in a fixed number of operations. To circumvent that problem, we use the periodic structure detection and elimination apparatus 56 shown in FIG. 5.

The process carried out by apparatus 56 begins at step 70 where the coefficients received from the FFT calculators 28, 30 are sorted to find the most significant value. The position of the most significant Fourier coefficient indicates the period of the signal. For each 64×32 FFT block, four horizontal and four vertical periods are identified. Periods corresponding to small values of Fourier coefficients (hereinafter called "insignificant period values") are eliminated from the list. The threshold for identifying these insignificant period values may be indicated as "thr_j" and one possible value of "thr_j" can be 8. Periods corresponding to large values of Fourier coefficients have a magnitude value greater than a threshold "thr_i" and are marked as "significant period values." One possible value of "thr_i" could be 32. It is to be noted that the values of the thresholds plays a role in the period identification. If the value of the thresholds is high, then the probability of detection of periodic structure is low and vice versa. In this manner, the most frequently occurring two/three periods in a 3×3 or a 5×5 kernel around the current window (block) are identified at step 72. These identified periods replace the computed pitch for the current window if the computed pitch is not significant. The identified periods are not used to replace the computed pitch if the computed pitch is significant.

In some embodiments the FFT magnitude analysis may be done for only the FFT path on the high pass motion vector path. The magnitude of the basis function may drop off monotonically from the basis function that represents the lower frequency to the basis function that represents a higher frequency, as the dominant trend. Apart from applying a threshold, an analysis seeking a departure from the above stated dominant trend. A departure from the dominant trend may be an indicator of the presence of a strong periodic structure. The information that may be obtained from correlating a 64×32 block of pixels with periodic structure information from the spatial neighborhood (e.g. the surrounding 8 64×32 pixel blocks) to arrive at an estimate. This may reduce chances of erroneous registration of periodic information. A high pass filter may be modeled as a filter whose output is similar to an absolute of first order differential operator. The first order differential, coupled with the absolute operator, may have an effect on reporting the dominant frequency components. The dominant frequency components may be reported with a multiple of 2. To resolve this, the pitch may be twice the pitch information implied from frequency domain.

Once the periods are identified, we have to identify the incorrect motion vectors associated with the periods. A threshold "thr" is identified and used to sweep the horizontal motion vectors in the range of (k*M−thr) to (k*M+thr) where M is the horizontal pitch and k is a positive integer. The inclusion of "k" may enable detection of incorrect motion vectors that exist on account of harmonics. A sweep of the vertical motion vectors in the range of (k*N−thr) to (k*N+thr) where N is the vertical pitch and k is a positive integer greater than zero is also performed. We identify the sweeping ranges through the use of look-up tables as shown in step 74, although other methods for identifying the sweeping ranges may be used. The tables disclosed herein are based on trial and error. Table I defines the relation between the position of the largest Fourier coefficient, the implied period of the signal, the upper pitch threshold, and the lower pitch threshold. The upper and lower thresholds may be chosen to create an overlap between the discrete periods identified at step 72.

TABLE I

| Position of Fourier Coefficient | Implied Period/Pitch | Upper pitch Threshold | Lower pitch Threshold |
|---|---|---|---|
| For N = 64 | | | |
| 1 | — | 1.9 | 1.9 |
| 2 | — | 6 | 5.5 |
| 3 | 42 | 5.5 | 2.5 |
| 4 | 32 | 2.5 | 2 |
| 5 | 26 | 1.9 | 1.9 |
| 6 | 22 | 1.9 | 1.9 |
| 7 | 18 | 1.9 | 1.9 |
| 8 | 16 | 1.9 | 1.9 |
| 9 | 14 | 1.9 | 1.9 |
| 10 | 12 | 1.9 | 1.9 |
| For N = 32 | | | |
| 1 | — | 1.9 | 1.9 |
| 2 | — | 1.9 | 1.9 |
| 3 | 22 | 1.9 | 1.9 |
| 4 | 16 | 1.9 | 1.9 |
| 5 | 12 | 1.9 | 1.9 |
| 6 | 10 | 1.9 | 1.9 |
| 7 | 10 | 1.9 | 1.9 |
| 8 | 8 | 1.9 | 1.9 |

As we can see from Table I, the accuracy of the identified pitch is more sensitive as it becomes smaller.

Returning to FIG. 5, the process performed by the apparatus 56 continues with step 76 in which a candidate dominant motion vector (MV) is determined, either by receipt or internal (to apparatus 56) calculation or selection. The determined candidate dominant motion vector may be determined based on an average of the dominant motion vectors for neighboring blocks. In the alternative, a motion vector estimated from the frequency response of the low-pass filtered image may be selected as the dominant candidate motion vector.

At step 78, an absolute value of the difference between the candidate motion vector and the estimated motion vectors 44, 54 is calculated. These absolute values are then compared to the range of (k*M−thr) to (k*M+thr) and the range of (k*N−thr) to (k*N+thr) where the upper and lower values of thr are taken from the table. Those motion vectors falling within that range are eliminated. The steps 76, 78, and 80 may be collectively referred to as a process for eliminating one or more of the estimated motion vectors based on the identified period. The output of the apparatus 56 is the pitch information identified in step 72 and the dominant motion vector identified by the process 82.

Figure 5:
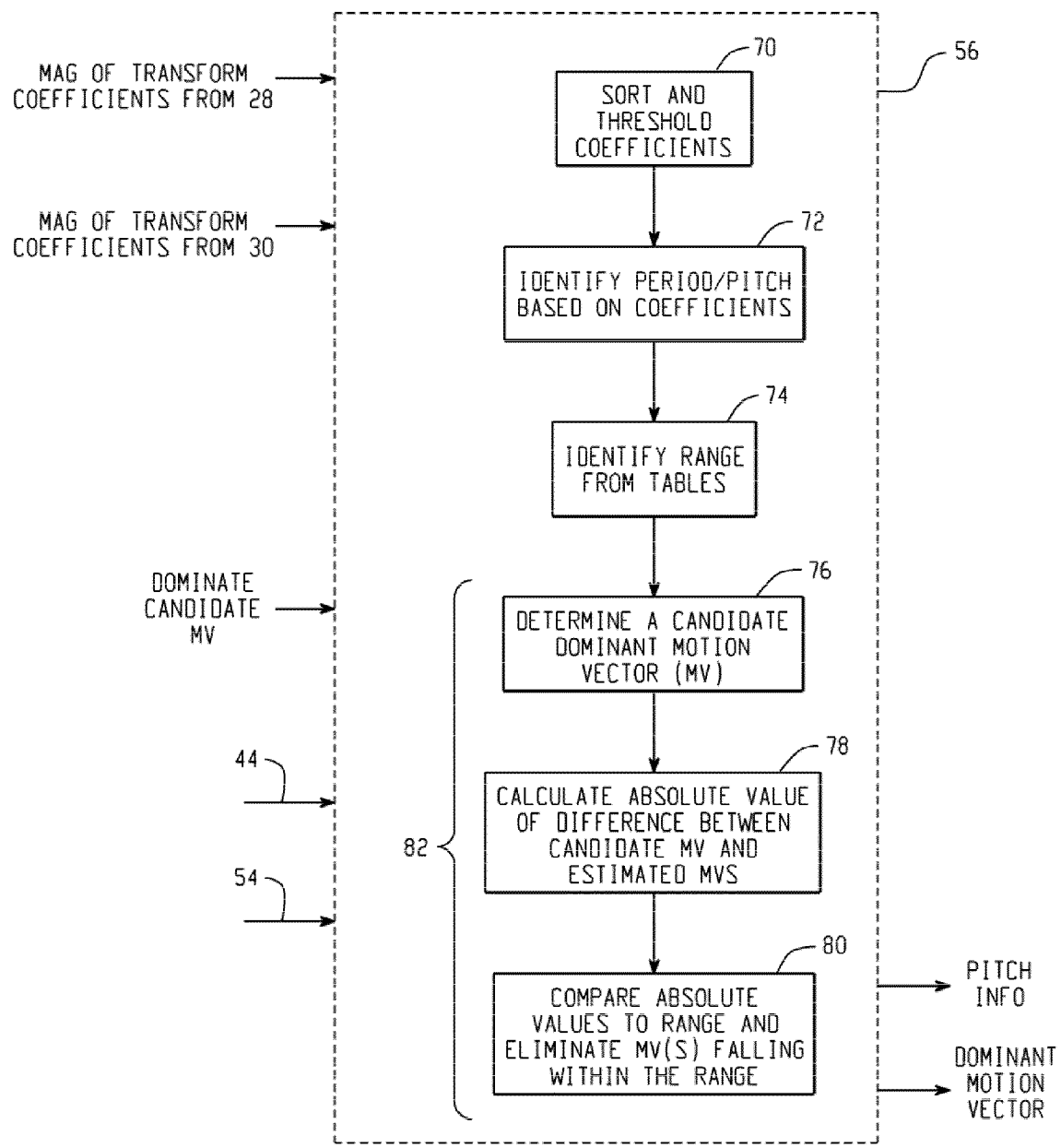
FIG. 5 is a flow chart illustrating the process of the present disclosure of eliminating estimated motion vectors to identify a dominant motion vector.

Examples will now be given to illustrate the process of FIG. 5. Two cases are illustrated. For simplicity, we will consider only one dimension. It is a simple matter to extend the examples for both dimensions.

Figure 6A:
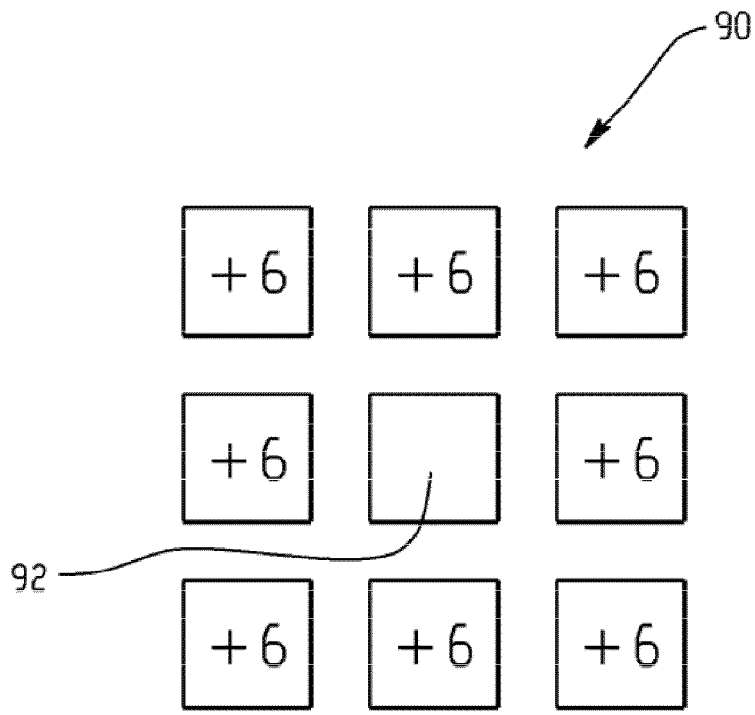
FIGS. 6A and 6B are examples illustrating one embodiment of the operation of the disclosed method.
Figure 6B:
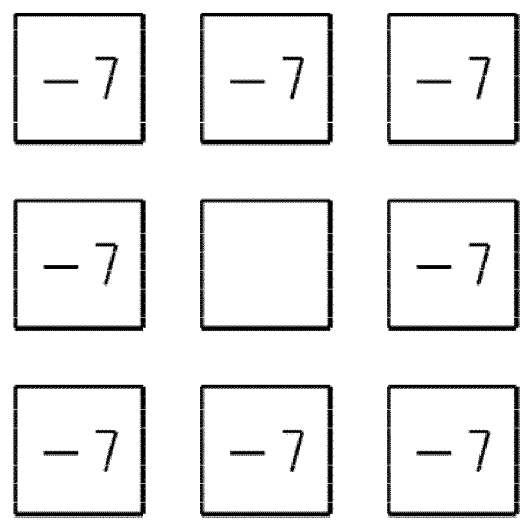

Example No. 1 is illustrated in FIGS. 6A and 6B. In FIG. 6A, a 3×3 kernel is analyzed in conjunction with a block 92 for which a motion vector is to be determined. For this example, we assume that the periodic motion vector is exactly equal to the period reported at step 72. Let us assume further that the period reported at step 72 is 13 and that two motion vectors having values of +6 and −7 have been estimated and input to the apparatus 56. Only one of the estimated motion vectors is correct, and the other motion vector is periodic noise. We depend on the dominant motion vector to determine the correct motion vector out of the estimated motion vectors +6 and −7.

A candidate dominant motion vector is chosen to be affine/local maxima motion vector. In the absence of a local maximum, we may use a top motion vector from the low-pass filter path or from an edge map. The assumption is that the top motion vector from the low-pass filter path is not corrupted. In the example of FIG. 6A, we chose a candidate motion vector to be +6 based on the motion vectors (+6) for each of the blocks neighboring block 92.

An absolute value of the difference between the candidate and each of the estimated motion vectors is computed, and the result is compared with the range defined by the upper and lower thresholds for the reported period of 13. If the absolute value lies within that range, that estimated motion vector is declared as a periodic outlier and eliminated.

If we assume that the candidate motion vector is +6, the absolute value of +6 minus 6 is zero and the absolute value of +6 minus −7 is 13. The lower limit of the range is 13−1.9 which is 11.1 and the upper limit of the range is 13+1.9 which is 14.9. Because the value 13 associated with the −7 motion vector falls within the range of 11.1 to 14.9, the −7 motion vector is eliminated. Because the value zero associated with the +6 motion vector does not fall within the range of 11.1 and 14.9, the +6 motion vector remains as the correct motion vector.

In FIG. 6B we use −7 as the candidate motion vector based on the motion vectors (−7) for each of the neighboring blocks. The absolute value of −7 minus +6 is 13. The absolute value of −7 minus −7 is zero. Because 13 falls within the range of 11.1 and 14.9 and zero does not, the +6 motion vector is eliminated and the −7 motion vector remains as the correct motion vector.

In example No. 2, we assume that the periodic motion vector lies within a threshold of the reported period. We will assume that the reported period at step 72 is 13. The two estimated motion vectors are +6 and −6.25. We assume that the candidate dominant motion vector is −6.25.

The absolute value of the difference between the estimated motion vector of −6.25 and the candidate dominant motion vector of −6.25 is zero. The absolute value of the difference between the estimated motion vector of +6 and the candidate dominant motion vector of −6.25 is 12.25. From Table 1, the threshold is defined to be 1.9 for a reported period of 13. That provides a range of 11.1 to 14.9. Because 12.25 falls within this range, the +6 motion vector is declared as an outlier and is eliminated. However, because zero falls outside of this range, the estimated motion vector −6.25 is properly identified as the dominant motion vector.

We can also make the range unequal by defining different lower and upper thresholds "lowthr" and "upthr," respectively. The range thus becomes (M−lowthr) to (M+upthr) for horizontal motion vectors and (N−lowthr) to (N+upthr) for vertical motion vectors. Further, we can also have different thresholds for horizontal and vertical motion vectors.

As noted above, picture rate up-conversion may be required from a variety of source video rates to a variety of target data rates. The factor of the source to target data rates dictates the number of intermediate frames that are interpolated into the target video. For example, an up-conversion from a 60 Hz source video to a 120 Hz target video requires the insertion of 1 frame between frames of the source video in the target video. Thus, one frame is inserted halfway between source video frames resulting in an interpolation factor of 0.5: 60 Hz/120 Hz=0.5. For conversion from a 24 Hz source video to 120 Hz target video, four frames are inserted between source frames in the target video. Inserting four frames between source video frames requires an intermediate frame to be inserted every 0.2 source frames resulting in interpolation factors of 0.2, 0.4, 0.6, and 0.8: 24 Hz/120 Hz=0.2.

The interpolation factor is utilized in generating intermediate frames. A final motion vector selected corresponds to the detected motion between the previous frame and the target frame. However, in the example of 60 Hz to 120 Hz conversion, the intermediate frame will depict an object motion halfway between the previous frame and the target frame. Thus, when calculating the proper motion of objects within a block in an intermediate frame, the final motion vector is multiplied by the interpolation factor, 0.5, to capture object position at the time of interest (i.e., the time of the intermediate frame). Similarly, with 24 Hz to 120 Hz conversion, the first intermediate frame utilizes the final motion vector multiplied by the first interpolation factor, 0.2, the second intermediate frame utilizes the final motion vector multiplied by the second interpolation factor, 0.4, the third intermediate frame utilizes the final motion vector multiplied by the third interpolation factor, 0.6, and the fourth intermediate frame utilizes the final motion vector multiplied by the fourth interpolation factor, 0.8.

Although the present disclosure describes the method and apparatus in terms of a presently preferred embodiment, those of ordinary skill in the art will recognize that many modifications and variations are possible. For example, although a certain order is disclosed, the order is not necessary unless the context dictates otherwise. Also, the ordering of steps may be avoided, in some cases, by performing steps in parallel. The following claims are intended to encompass all such modifications and variations.

It is claimed:

1. A method comprising:
    performing a transform on at least one image to produce a frequency-domain representation of said at least one image;
    based on said frequency-domain representation, i) estimating a plurality of motion vectors and ii) identifying a period;
    selecting a dominant vector based on i) said estimated motion vectors and ii) said identified period; and
    identifying a range for the dominant motion vector based on said identified period,
    wherein said selecting the dominant motion vector comprises:
        determining a candidate dominant motion vector;
        calculating an absolute value of a difference between said candidate dominant motion vector and each of said estimated motion vectors;
        comparing each of said absolute values with said range; and
        eliminating estimated motion vectors based on said comparing.

2. The method of claim 1 wherein said identifying a period comprises identifying a period from magnitudes of responses at coefficients used to produce said frequency-domain representation.

3. The method of claim 1 wherein said determining a candidate dominant motion vector comprises selecting a candidate dominant motion vector based on an average of dominant motion vectors for neighboring blocks.

4. The method of claim 1 wherein said eliminating occurs when an absolute value falls within said range.

5. The method of claim 1 wherein said identifying a range comprises looking up a range in a table based on said identified period.

6. The method of claim 1 wherein said range is further based on the number of coefficients used to produce said frequency-domain representations.

7. The method of claim 1 further comprising:
filtering each of two images,
wherein said performing a transform comprises performing a Fourier transform on said filtered images to produce a frequency-domain representation of each of said two images.

8. The method of claim 7 wherein said filtering comprises filtering said images through a high-pass filter and a low-pass filter.

9. A method comprising:
performing a transform on at least one image to produce a frequency-domain representation of said at least one image;
based on said frequency-domain representation, i) estimating a plurality of motion vectors and ii) identifying a period; and
selecting a dominant vector based on i) said estimated motion vectors and ii) said identified period;
filtering each of two images, wherein said performing a transform comprises performing a Fourier transform on said filtered images to produce a frequency-domain representation of each of said two images, and wherein said filtering comprises filtering said images through a high-pass filter and a low-pass filter; and
identifying a range for the dominant motion vector based on said identified period,
wherein said selecting the dominant motion vector comprises:
determining a candidate dominant motion vector;
calculating an absolute value of a difference between said candidate dominant motion vector and each of said estimated motion vectors;
comparing each of said absolute values with said range; and
eliminating estimated motion vectors based on said comparing.

10. The method of claim 9 wherein said determining a candidate dominant motion vector comprises selecting a motion vector estimated from a frequency response of said low-pass filter.

11. The method of claim 2 wherein said identifying a range includes identifying a range for the dominant motion vector based on i) said identified period and ii) the number of coefficients in said frequency-domain representation of said image; and
wherein said selecting comprises eliminating one or more of said plurality of estimated motion vectors based on said identified range.

12. A system comprising:
a transform calculator for performing a transform on at least one image to produce a frequency-domain representation of said image;
an estimating calculator for estimating a plurality of motion vectors based on said frequency-domain representation;
a periodic structure detection and elimination module, responsive to said transform calculator and said estimating calculator,
for identifying a period based on said frequency-domain representation of said image, and
for selecting a dominant motion vector based on i) said estimated motion vectors and ii) said identified period; and
a high-pass filter and a low-pass filter, wherein said transform calculator is responsive to said high-pass filter and said low-pass filter;
wherein said identified periodic structure detection and elimination module is configured to:
identify a range for a dominant motion vector in response to said transform calculator;
determine a candidate dominant motion vector;
calculate an absolute value of a difference between said candidate dominant motion vector and each of said estimated motion vectors;
compare each of said absolute values with said range; and
eliminate estimated motion vectors based on said comparing.

13. The system of claim 12 wherein said candidate dominant motion vector is based on an average of dominant motion vectors for neighboring blocks.

14. The system of claim 12 wherein said candidate dominant motion vector is based on a motion vector estimated from a frequency response of said low-pass filter.

15. The system of claim 12 wherein said eliminating occurs when an absolute value falls within said range.

16. The system of claim 12 wherein said identifying a range comprises looking up a range in a table based on said identified period.

* * * * *